United States Patent [19]

Sham

[11] Patent Number: 5,735,190
[45] Date of Patent: Apr. 7, 1998

[54] COMBINATION BREAD-BAKING MACHINE AND CONVECTION OVEN

[76] Inventor: John C. K. Sham, Rm. 1508, Block C, 19 Broadhead Road, Hong Kong, Hong Kong

[21] Appl. No.: 758,840

[22] Filed: Dec. 2, 1996

Related U.S. Application Data

[60] Provisional application No. 60/023,626, Aug. 9, 1996.
[51] Int. Cl.⁶ .................................................. A47J 27/00
[52] U.S. Cl. ......................... 99/327; 99/340; 99/348; 99/357; 99/468; 366/144; 366/146; 366/314
[58] Field of Search ........................ 99/325–333, 340, 99/339, 348, 357, 467, 448, 468, 483; 366/69, 98, 144–146, 314, 601; 126/21 A; 426/504, 512; 219/400, 401

[56] References Cited

U.S. PATENT DOCUMENTS 5,445,061  8/1995  Barradas ................................... 99/340

*Primary Examiner*—Timothy F. Simone
*Attorney, Agent, or Firm*—Salzman & Levy

[57] ABSTRACT

The present invention features a combination bread-baker and a convection oven that bakes or cooks food thoroughly and evenly. Air is circulated through the baking or cooking chamber via a fan disposed in the side of the baking/cooking chamber. Steam can be introduced into the baking/cooking chamber during a cooking cycle by means of a steam-generator. A water reservoir supplies water to a steam-generating tube that is contiguously adjacent a portion of the heating coil. A microprocessor digitally controls both the baking and the cooking cycles. A pair of sensors positioned about the baking/cooking chamber send signals to the microprocessor that indicate levels of both heat and humidity within the chamber. The sensors continuously monitor the baking or cooking conditions within the chamber. The microprocessor uses the updated information to continuously adjust either the amount of steam being introduced, or the speed of the fan for adjusting the circulating air. A rotational drive-motor used to turn a wand that kneads the dough when making bread can also be used to stir soups and gravies during a cooking cycle. The wand can also be replaced by a spit to support and rotate a roast or fowl during a cooking cycle, giving rise to a rotisserie operation. The convection currents of the oven, the steam injection and the rotisserie function all ensure that food is thoroughly and evenly cooked.

17 Claims, 9 Drawing Sheets

COMBINATION BREAD-BAKING MACHINE AND CONVECTION OVEN

This application claims the benefit of U.S. Provisional Application No. 60/023,626, filed Aug. 09, 1996.

FIELD OF THE INVENTION

The present invention pertains to a combination bread-baking machine and a convection oven, and, more particularly, to an appliance that more evenly distributes heat throughout its baking or cooking chamber in order to more thoroughly bake or cook the bread or food therein.

BACKGROUND OF THE INVENTION

Recently, computer peripheral-devices have been developed that perform more than one function. It is not uncommon to find facsimile machines that can also be used as scanners, copiers and answering machines. The only disadvantage of combining all of these functions into one unit is that, quite often, these added functions cannot be accomplished as well as they could in separate units.

In the home-appliance field, it makes sense to combine baking and cooking functions into a single unit, as with the aforementioned, multipurpose, computer device. The multiplicity of function is easily accomplished by a digitally-controlled microprocessor that changes the baking or cooking cycles to accommodate a selected food to be prepared. Such an appliance takes advantage of components that can commonly be used for dual purposes, such as heating coils, fans, housings, etc.

Unlike the aforesaid, multipurpose, fax machine, the present invention of a dual bread-baker and cooking oven does not decrease the baking or cooking function because of the combination. Rather, the combining of the baking function with the cooking function into one unit has the opposite effect, i.e., the baking and the cooking operations become synergistically enhanced. Better-tasting and more-quickly prepared foods result from this marriage of baking and cooking.

The present invention combines a bread-baking apparatus with a convection oven, so that heat is more evenly distributed throughout the baking/cooking chamber. This combination is not just an aggregation of parts; it is a synergistic operation, wherein food is prepared more quickly; is more uniformly baked or cooked; and the probability of burning the food is decreased. Steam is easily introduced during a cooking cycle by flashing water into steam via a steam-generating tube disposed contiguously adjacent the heating coil. Heat radiating from the heating coil can be fan-circulated about the chamber to more uniformly bake bread or cook food.

It is an object of this invention to provide a bread-baker and a convection oven with steam into a single, baking-and-cooking appliance having food-preparation characteristics that are synergistically superior to that of either appliance standing alone.

It is another object of the invention to provide a bread-baker and a convection oven that is digitally controlled by a microprocessor.

SUMMARY OF THE INVENTION

In accordance with the present invention, there is provided a combination bread-baker and convection oven that bakes or cooks food thoroughly and evenly. Air is circulated through the baking or cooking chamber via a fan disposed in the side of the baking/cooking chamber. Steam can be introduced into the baking/cooking chamber during a cooking cycle by means of a steam-generator. A water reservoir supplies water to a steam-generating tube that is contiguously adjacent a portion of the heating coil. A microprocessor digitally controls both the baking and the cooking cycles. A pair of sensors disposed about the baking/cooking chamber send signals to the microprocessor that indicate levels of both heat and humidity within the chamber. The sensors continuously monitor the baking or cooking conditions within the chamber. The microprocessor uses the updated information to continuously adjust either the amount of steam being introduced, or the speed of the fan for adjusting the circulating air. A rotational drive-motor used to turn a wand that kneads the dough when making bread can also be used to stir soups and gravies during a cooking cycle. The wand can also be replaced by a spit to support and rotate a roast or fowl during a cooking cycle, thus giving rise to a rotisserie operation. The convection currents of the oven, the steam injection and the rotisserie function all ensure that the food is thoroughly and evenly cooked.

BRIEF DESCRIPTION OF THE DRAWINGS

A complete understanding of the present invention may be obtained by reference to the accompanying drawings, when taken in conjunction with the subsequent, detailed description, in which.

For the purposes of clarity and brevity, like elements and components will bear the same designations or numbers throughout the FIGURES.

DESCRIPTION OF THE PREFERRED EMBODIMENT

Generally speaking, the invention features an appliance that is synergistically fabricated by using a bread-baker and a convection oven. Better than any design heretofore, this synergistic, combination appliance allows raw dough during the bread-baking function to both rise and become golden faster, and to bake more thoroughly, as a result of the circulating air provided by the convection fan used during the convection cooking function. Soups can be stirred during a cooking function, using the bread-kneading wand utilized in the baking function, thus ensuring a quicker and more thorough cooking of soups than that heretofore provided. The rotary function of the wand used for bread-baking can also double as a spit for roasts or fowl during a cooking function. Steam can be introduced into this appliance by means of a water reservoir that feeds water to a steam-generating tube, which is contiguously adjacent a portion of the heating coil, as illustrated in the co-pending patent application entitled "Steam Toaster Oven", filed concurrently herewith, bearing Ser. No. 60/023,624.

Figure 1:
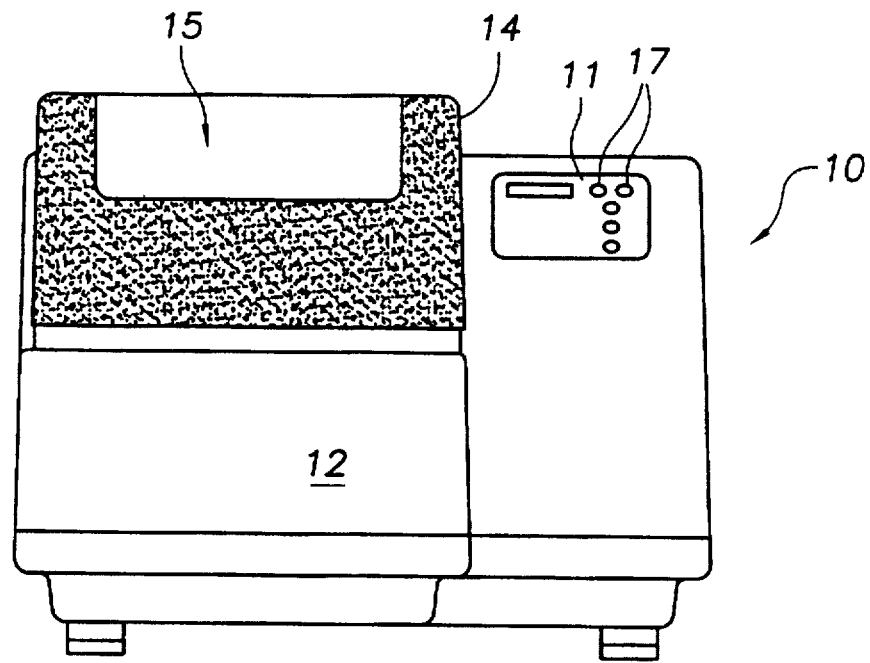
FIG. 1 illustrates a front view of the combination bread-baker and convection oven of this invention.
Figure 2:
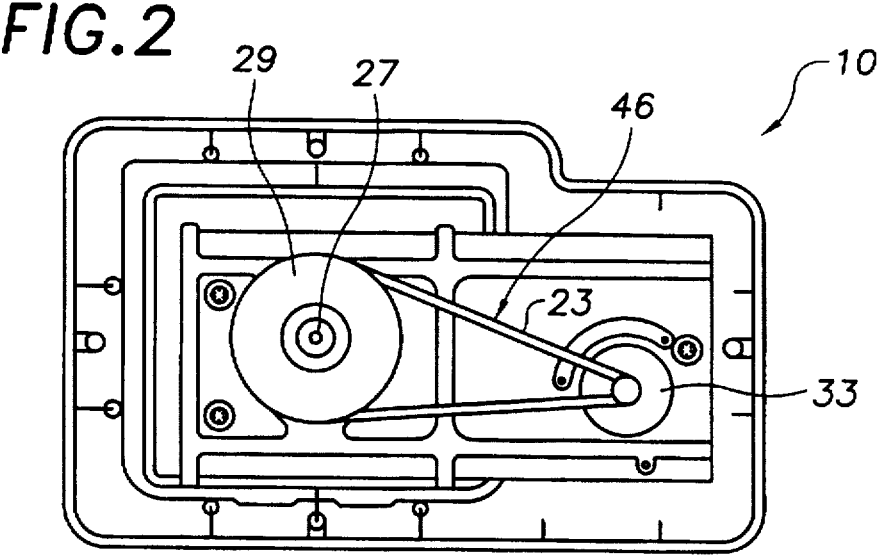
FIG. 2 depicts a bottom view of the combination bread-baker and convection oven shown in FIG. 1.
Figure 1A:
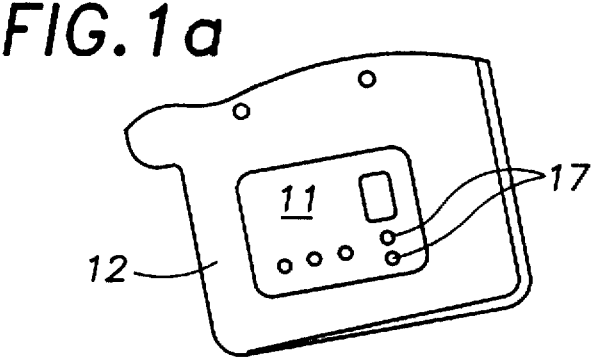
FIG. 1a shows a plan view of a control panel illustrated in the combination bread-baker and convection oven illustrated in FIG. 1.
Figure 3:
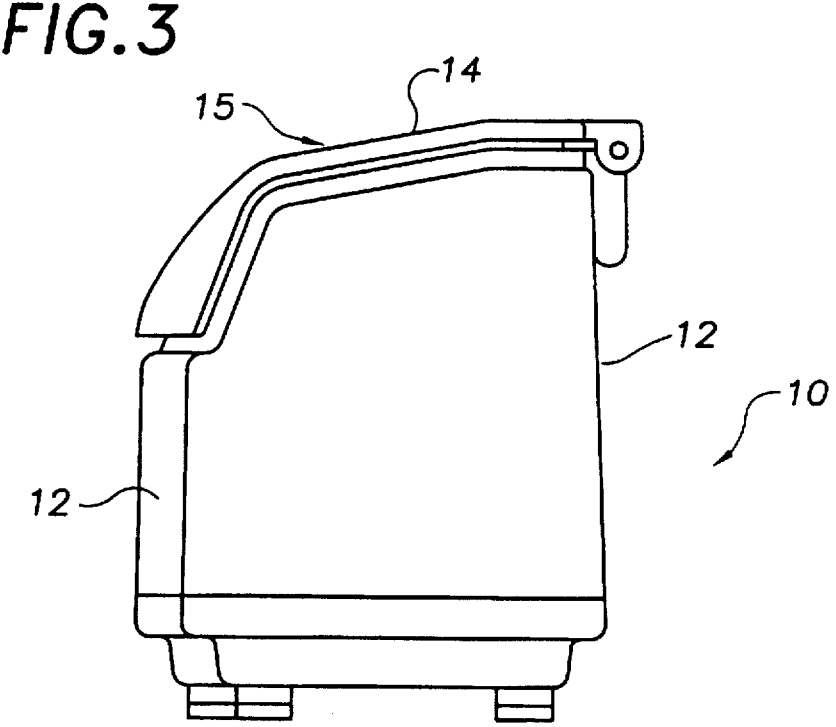
FIG. 3 shows a side view of the combination bread-baker and convection oven depicted in FIG. 1.

Now referring to FIGS. 1 through 3, the combination bread-baking machine and convection oven appliance 10 of this invention is illustrated. The appliance 10 features a polymeric housing 12 and a cover 14. The cover 14 also comprises a polymeric, transparent window 15. The polymeric material may be a polycarbonate or another heat-insulating material. A heat-insulating material is preferred, so that the appliance 10 will be cool to the touch. A control panel 11, disposed on the front face of the housing 12 (as shown in greater detail in the enlarged view of FIG. 1a), has various control buttons 17, to allow the user to choose between baking or cooking cycles.

Figure 4:
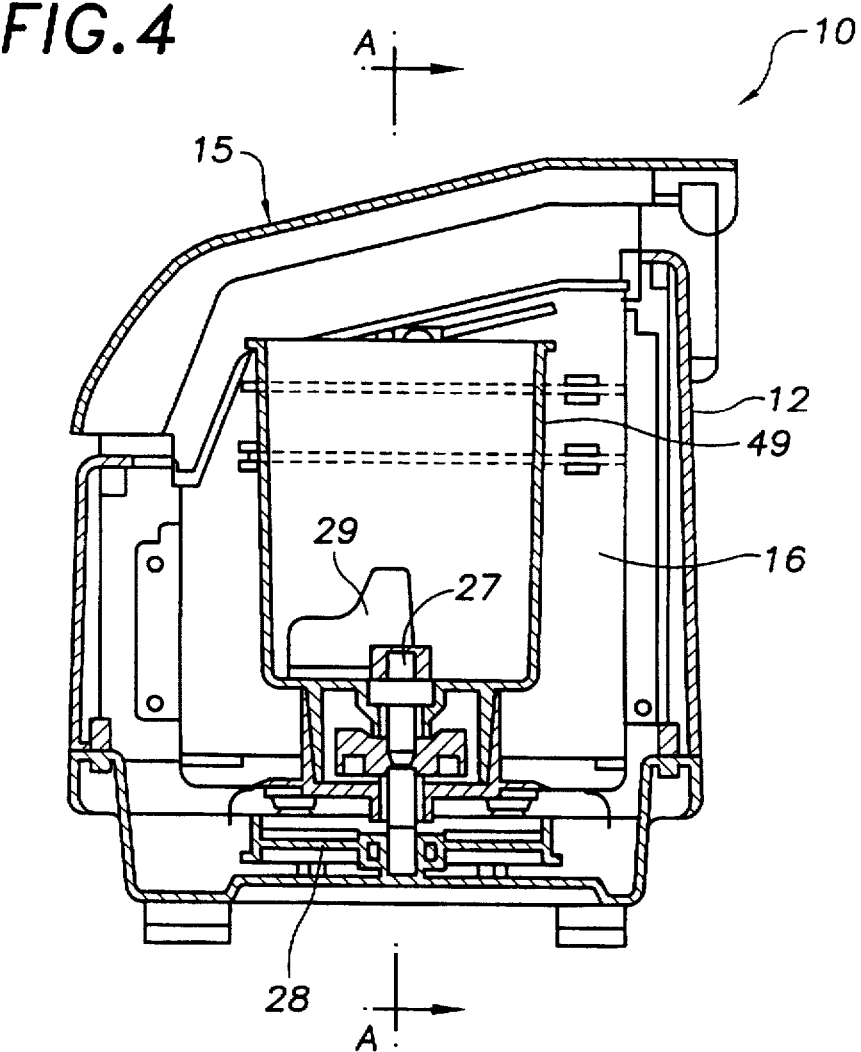
FIG. 4 illustrates a sectional view of the combination bread-baker and convection oven, taken along lines B—B of FIG. 8.
Figure 5:
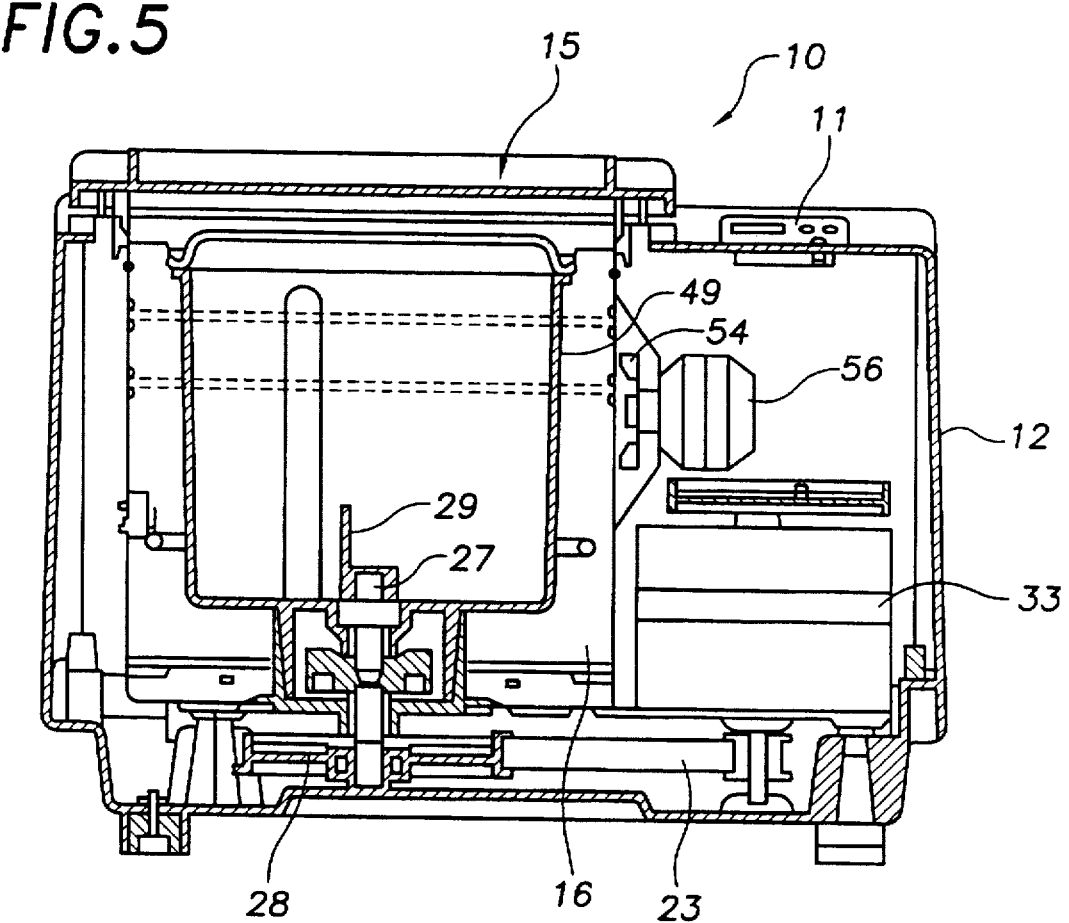
FIG. 5 depicts a sectional view of FIG. 4, taken along lines A—A.
Figure 6:
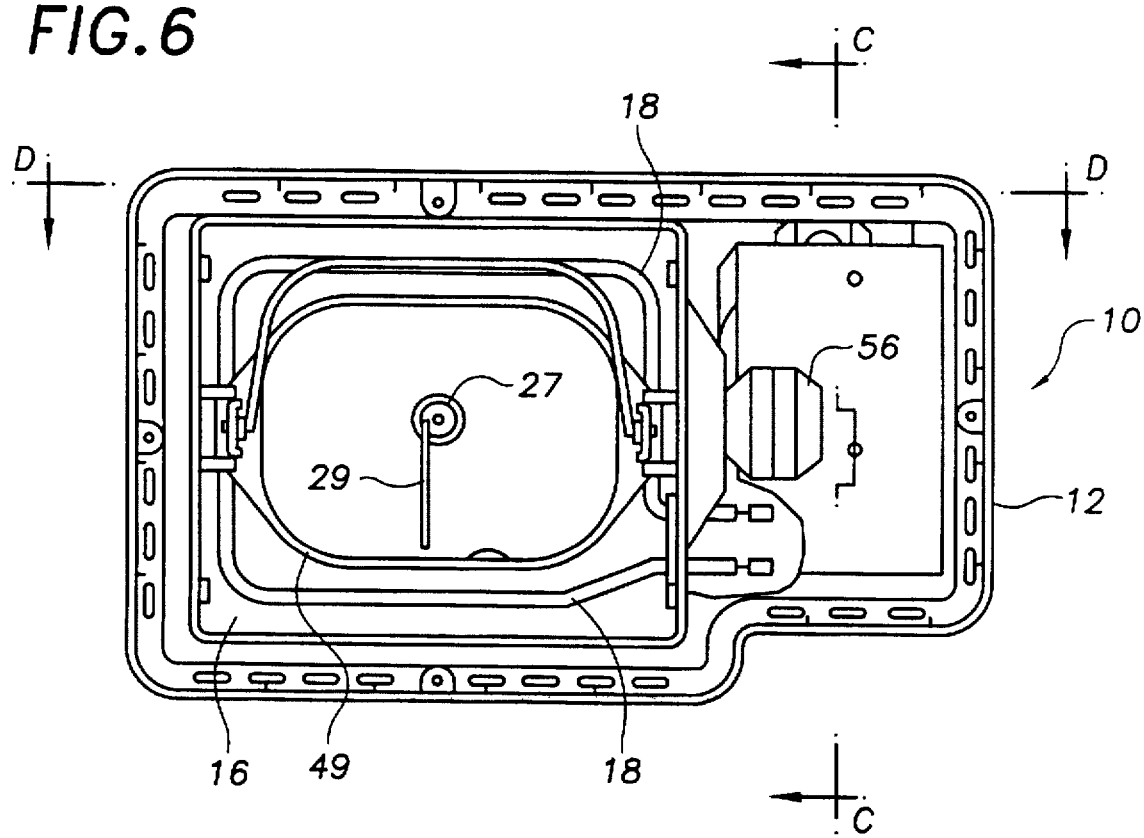
FIG. 6 shows a partial, top view of FIG. 5.

Referring to FIGS. 4 through 6, the appliance 10 is shown comprising a baking/cooking chamber 16, a removable bowl 49 for kneading bread and cooking soups and a convection fan 54 that distributes the heat in the chamber 16. The convection fan 54 is powered by an electric motor 56. A heating coil 18 provides the heat for baking and cooking.

Figure 10:
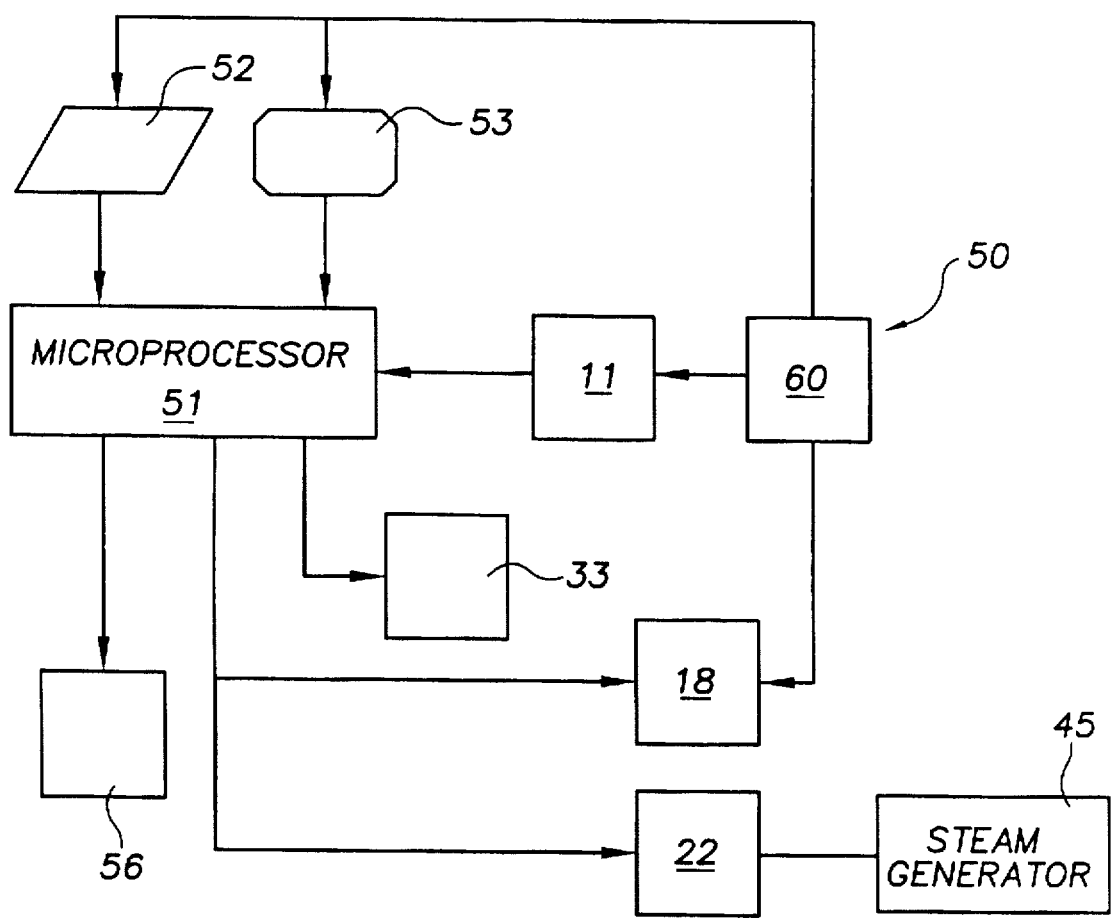
FIG. 10 illustrates a schematic, diagrammatic view of the electrical control-circuit of the appliance of this invention, as depicted in FIGS. 1 through 9.

Referring to FIG. 10, a schematic, circuit diagram 50 is shown. The appliance 10 is operated by a circuit 50 which comprises a microprocessor 51. The microprocessor 51 digitally controls the appliance 10; it has programmed routines for operating the appliance 10 in a bread-baking cycle or various cooking cycles. A heating sensor 52 disposed in the chamber 16 senses the oven temperature, and sends a signal to the microprocessor 51. The signal is continuously monitored by the microprocessor 51, which adjusts the temperature in accordance with the particular baking or cooking cycle. The temperature is adjusted by controlling the current that is supplied to the baking/cooking chamber's heating coil 18 (FIG. 6), via power source 60. The power source 60 also powers the control panel 11, as well as sensors 52 and 53. Sensor 53 is a humidity sensor disposed within chamber 16 for determining the moisture content therein. The signal of sensor 53 is continuously monitored by the microprocessor 51, which controls the injection of steam into the chamber 16. The fan motor 56 can be turned on by the microprocessor 51 to remove humidity from the cooking chamber 16 during a baking/cooking cycle, as well as to distribute the heat therein. Steam is generated and injected into the baking/cooking chamber 16 by means of a steam-generating tube 45, which is disposed contiguously adjacent a portion of the heating coil 18. Water is supplied from a refillable water tank (not shown) to the steam-generating tube 45, where it evaporates into steam, as described in the aforementioned, co-pending application, Ser. No. 60/023,624. A water-supply valve 22 is controlled by the microprocessor 51; it feeds a controlled amount of water to the steam-generating tube 45, so that the microprocessor 51 controls the amount of steam injected into the chamber 16.

Bread dough can be kneaded by placing the dough in the removable bowl 49. A kneading wand 29 is rotated within the bowl 49 by means of a pulley drive system 46, illustrated in FIGS. 2, 4 and 5. The pulley drive system 46 comprises a motor 33, a pulley cord 23 and a drive pulley 28.

The kneading wand 29 is also removable for purposes of cleaning. The kneading wand 29 can be used as a soup stirrer, but it can also be replaced by an interchangeable platform (not shown) or a rotisserie spit (not shown). Both the interchangeable platform and spit may be used to support food within the baking/cooking chamber 16, in order to procure uniform heating for all food surfaces with respect to the heating coil 18.

Figure 7:
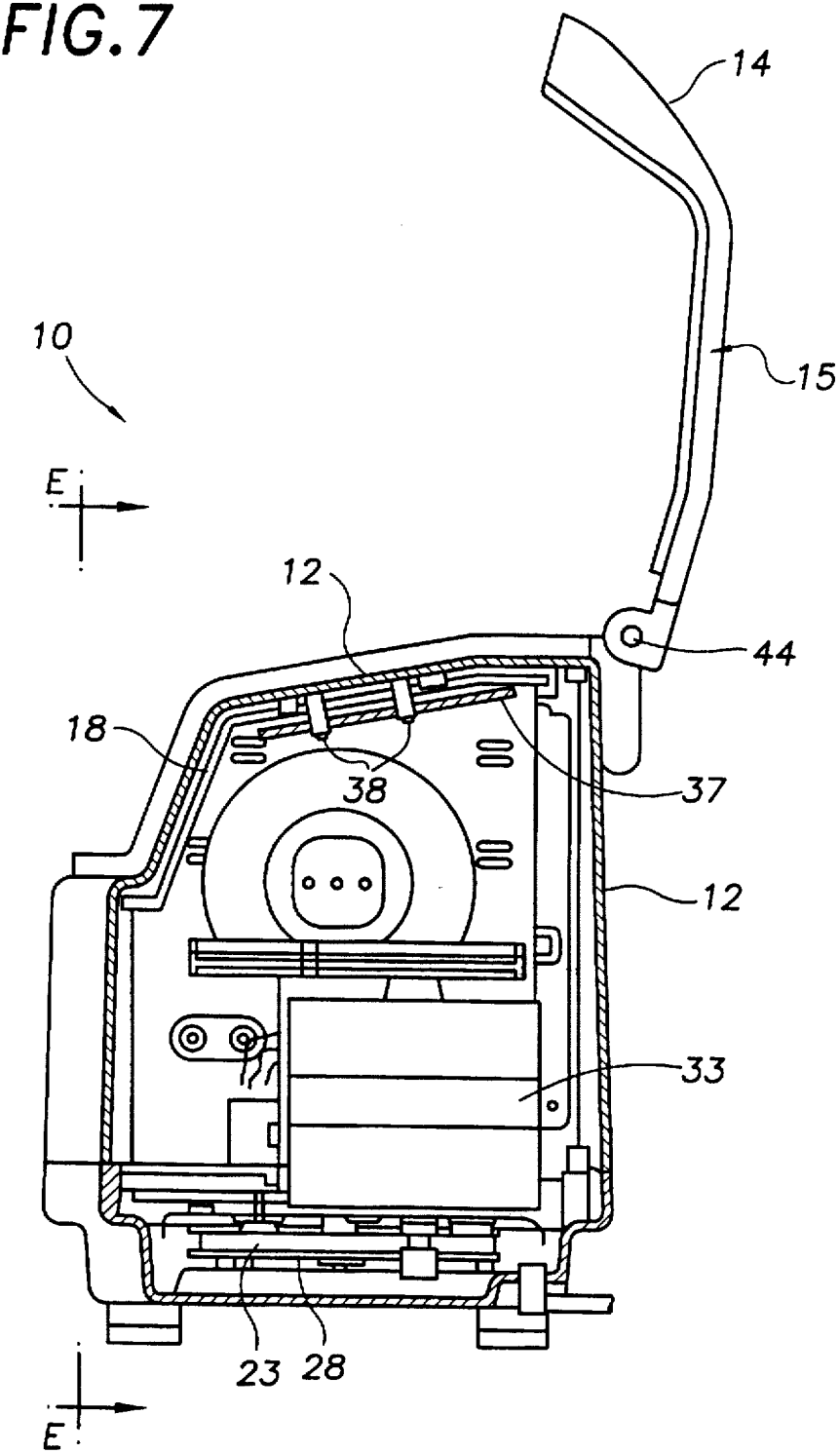
FIG. 7 illustrates a sectional view of FIG. 6, taken along lines C—C.

Referring to FIG. 7, the cover 14 is shown in its open position. The cover 14 is hinged to the housing 12 at point 44. A protective shield 37 is provided to prevent contact with the heating coil 18. The shield 37 is mounted to the housing 12 via screws 38. The protective shield 37 can also prevent splatter from hitting the heating coil 18.

Figure 8:
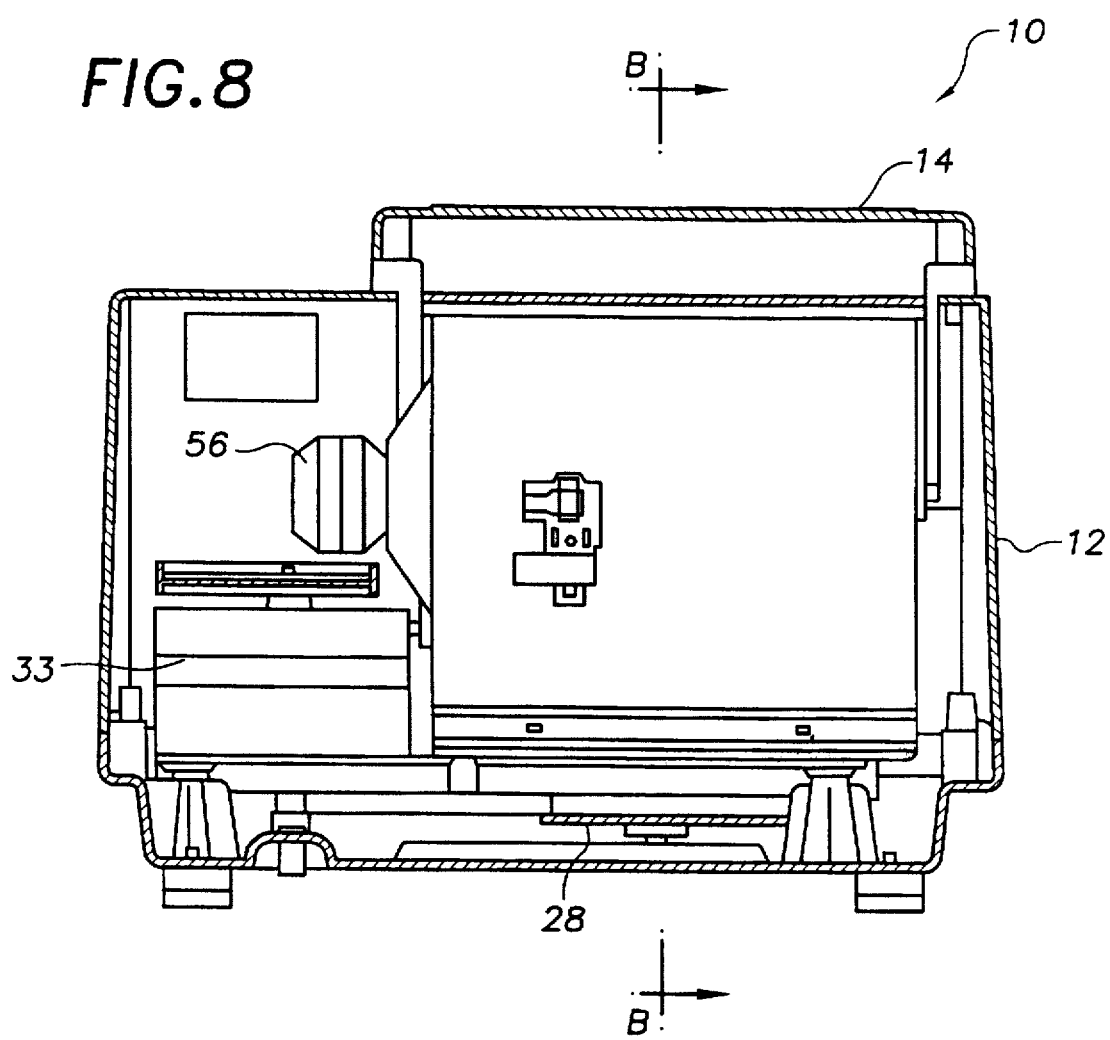
FIG. 8 depicts a sectional view of FIG. 6, taken along lines D—D.
Figure 9:
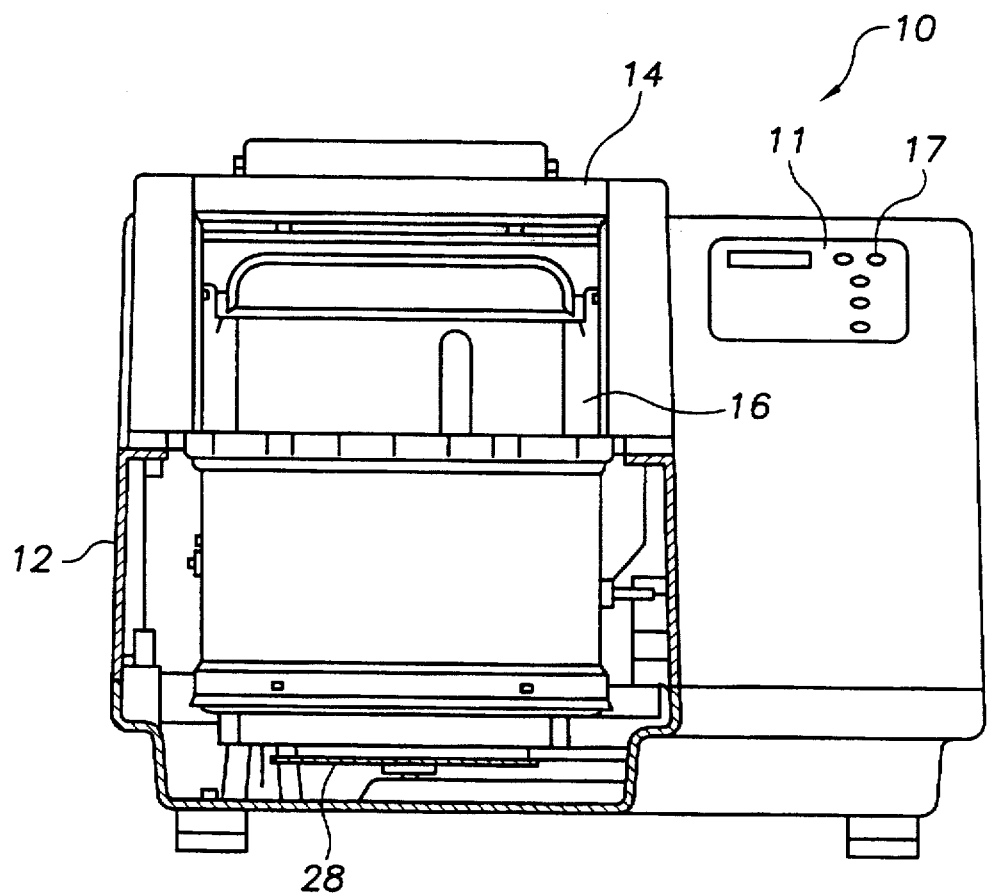
FIG. 9 shows a sectional view of FIG. 7, taken along lines E—E.

Referring to FIGS. 8 and 9, other sectional views of the appliance 10 are shown. As a convection oven, the appliance 10 can cook foods faster and more uniformly than that heretofore designed, both as a result of the circulating air within the chamber 16, and because of the injection of steam.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A combination bread-baker and convection oven, comprising:

a housing having a baking and cooking chamber;

a heating coil supported by said housing, for supplying heat to said baking and cooking chamber;

a motor-driven fan mounted adjacent said baking and cooking chamber, for circulating heated air about said baking and cooking chamber;

a first drive-motor supported by said housing, for driving said motor-driven fan;

a rotatable kneading wand disposed in said baking/cooking chamber for kneading bread dough;

a removable mixing bowl disposed in said baking/cooking chamber, for containing bread dough;

a second drive-motor supported by said housing, for rotatably driving said kneading wand;

a microprocessor operatively connected to said heating coil and said first and second drive-motors, for digitally controlling baking and cooking cycles;

a control panel supported by said housing and operatively connected to said microprocessor for selecting a baking or cooking cycle; and a temperature sensor disposed within said baking and cooking chamber, said temperature sensor being operatively connected to said microprocessor, said temperature sensor sending a signal to said microprocessor that is indicative of the degree of temperature within said baking and cooking chamber, so that said microprocessor can cyclically control heat within said baking and cooking chamber by controlling said heating coil and said motor-driven fan.

2. The combination bread-baker and convection oven in accordance with claim 1, further comprising a humidity sensor disposed within said baking and cooking chamber, said humidity sensor being operatively connected to said microprocessor, said humidity sensor sending a signal to said microprocessor that is indicative of the level of moisture within said baking and cooking chamber, so that said microprocessor can digitally control the amount of moisture provided to said baking and cooking chamber.

3. The combination bread-baker and convection oven in accordance with claim 1, further comprising a platform which is interchangeable with said removable mixing bowl, said platform being able to support food that is to be cooked within said baking and cooking chamber.

4. The combination bread-baker and convection oven in accordance with claim 1, wherein said second drive-motor includes a pulley system.

5. The combination bread-baker and convection oven in accordance with claim 1, wherein said housing comprises a polymeric material that is cool to the touch.

6. The combination bread-baker and convection oven in accordance with claim 5, wherein said polymeric material comprises polycarbonate.

7. The combination bread-baker and convection oven in accordance with claim 1, further comprising a transparent lid that is hinged to said housing.

8. A combination bread-baker and convection oven that uniformly bakes and cooks food due to circulating air in its baking and cooking chamber and due to the introduction of steam into said baking/cooking chamber, said combination bread-baker and convection oven comprising:

a housing having a baking and cooking chamber;

a heating coil supported by said housing, for supplying heat to said baking and cooking chamber;

a motor-driven fan mounted adjacent said baking and cooking chamber, for circulating heated air about said baking and cooking chamber;

a first drive-motor supported by said housing, for driving said motor-driven fan;

a rotatable kneading wand disposed in said baking and cooking chamber for kneading bread dough;

a removable mixing bowl disposed in said baking and cooking chamber, for containing bread dough;

a second drive-motor supported by said housing, for rotatably driving said kneading wand;

a microprocessor operatively connected to said heating coil and said first and second drive-motors, for digitally controlling baking and cooking cycles;

a steam-generating means supported by said housing, for generating steam for injection into said baking and cooking chamber;

a water-supply valve operatively connected to said microprocessor, for supplying a controlled amount of water to said steam-generation means, whereby a given amount of steam is generated under the control of said microprocessor;

a control panel, supported by said housing and operatively connected to said microprocessor for selecting a baking or cooking cycle; and a humidity sensor disposed within said baking and cooking chamber, said humidity sensor being operatively connected to said microprocessor, said humidity sensor sending a signal to said microprocessor that is indicative of the level of moisture within said baking and cooking chamber, so that said microprocessor can digitally control the amount of moisture provided to said baking and cooking chamber.

9. The combination bread-baker and convection oven in accordance with claim 8, further comprising a temperature sensor disposed within said baking and cooking chamber, said temperature sensor being operatively connected to said microprocessor, said temperature sensor sending a signal to said microprocessor that is indicative of the degree of temperature within said baking and cooking chamber, so that said microprocessor can cyclically control heat within said baking/cooking chamber by controlling said heating coil and said motor-driven fan.

10. The combination bread-baker and convection oven in accordance with claim 8, further comprising a platform which is interchangeable with said removable mixing bowl, said platform being able to support food that is to be cooked within said baking and cooking chamber.

11. The combination bread-baker and convection oven in accordance with claim 8, wherein said second drive-motor includes a pulley system.

12. The combination bread-baker and convection oven in accordance with claim 8, wherein said housing comprises a polymeric material that is cool to the touch.

13. The combination bread-baker and convection oven in accordance with claim 12, wherein said polymeric material comprises polycarbonate.

14. The combination bread-baker and convection oven in accordance with claim 8, further comprising a transparent lid that is hinged to said housing.

15. A combination bread-baker and convection oven that is cool to the touch, comprising:

a housing comprising a polymeric material that is cool to the touch, said housing having a baking and cooking chamber disposed therein;

a heating coil supported by said housing, for supplying heat to said baking and cooking chamber;

a motor-driven fan mounted adjacent said baking and cooking chamber, for circulating heated air about said baking and cooking chamber;

a first drive-motor supported by said housing, for driving said motor-driven fan;

a rotatable kneading wand disposed in said baking/cooking chamber for kneading bread dough;

a removable mixing bowl disposed in said baking/cooking chamber, for containing bread dough;

a second drive-motor supported by said housing, for rotatably driving said kneading wand;

a microprocessor operatively connected to said heating coil and said first and second drive-motors, for digitally controlling baking and cooking cycles; and a control panel supported by said housing and operatively connected to said microprocessor for selecting a baking or cooking cycle.

16. The combination bread-baker and convection oven in accordance with claim 15, wherein said polymeric material comprises polycarbonate.

17. The combination bread-baker and convection oven in accordance with claim 15, further comprising a transparent lid that is hinged to said housing.

* * * * *